US011489167B2

(12) United States Patent
Graf et al.

(10) Patent No.: US 11,489,167 B2
(45) Date of Patent: Nov. 1, 2022

(54) METHOD FOR PRODUCING A SUPPORTED CATALYST MATERIAL FOR A FUEL CELL

(71) Applicants: VOLKSWAGEN AG, Wolfsburg (DE); AUDI AG, Ingolstadt (DE)

(72) Inventors: Tanja Graf, Braunschweig (DE); Thomas Schladt, Braunschweig (DE)

(73) Assignee: Audi AG, Ingolstadt (DE)

( * ) Notice: Subject to any disclaimer, the term of this patent is extended or adjusted under 35 U.S.C. 154(b) by 394 days.

(21) Appl. No.: 16/313,874

(22) PCT Filed: Jun. 26, 2017

(86) PCT No.: PCT/EP2017/065642
§ 371 (c)(1),
(2) Date: Dec. 27, 2018

(87) PCT Pub. No.: WO2018/001930
PCT Pub. Date: Jan. 4, 2018

(65) Prior Publication Data
US 2019/0157686 A1 May 23, 2019

(30) Foreign Application Priority Data
Jun. 30, 2016 (DE) ..................... 10 2016 111 981.4

(51) Int. Cl.
*H01M 4/88* (2006.01)
*H01M 4/86* (2006.01)
(Continued)

(52) U.S. Cl.
CPC ....... *H01M 4/8817* (2013.01); *H01M 4/8657* (2013.01); *H01M 4/8867* (2013.01);
(Continued)

(58) Field of Classification Search
None
See application file for complete search history.

(56) References Cited

U.S. PATENT DOCUMENTS 6,379,476 B1 * 4/2002 Tarutani .............. H01M 8/0206 134/41
7,303,834 B2 * 12/2007 Dearnaley ........... H01M 4/8621 429/431
(Continued)

FOREIGN PATENT DOCUMENTS

CN 104203408 * 12/2014 .............. B01J 23/40
CN 105788887 * 7/2016 ............. Y02E 60/10
(Continued)

*Primary Examiner* — Jonathan Crepeau
*Assistant Examiner* — Angela J Martin
(74) *Attorney, Agent, or Firm* — Seed IP Law Group LLP

(57) ABSTRACT

The invention relates to a method for producing a supported catalyst material for a fuel-cell electrode, as well as a catalyst material that can be produced using said method. In the method, first, a carbide-forming substance is deposited from the gas phase onto the carbon-based carrier material to produce a carbide-containing layer and, then, a catalytically-active precious metal or an alloy thereof from the gas phase is deposited to form a catalytic layer. By chemical reaction of the carbide-forming substance with the carbon, very stable carbide bonds are formed at the interface, while an alloy phase of the two forms at the interface between carbide-forming substance and precious metal. Overall, a very stable adhesion of the catalytic precious metal to the substrate results, whereby degradation effects are reduced, and the life of the material is extended.

19 Claims, 3 Drawing Sheets

Figure 1:
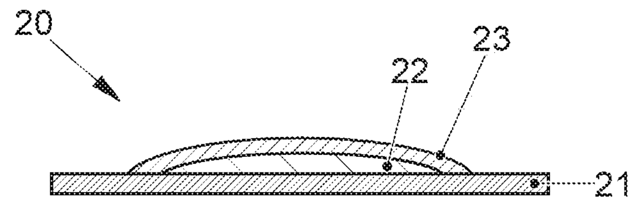

(51) Int. Cl.
*H01M 4/92* (2006.01)
*H01M 8/10* (2016.01)

(52) U.S. Cl.
CPC ............. *H01M 4/92* (2013.01); *H01M 4/921* (2013.01); *H01M 4/926* (2013.01); *H01M 2008/1095* (2013.01)

(56) References Cited

U.S. PATENT DOCUMENTS

| | | | | |
|---|---|---|---|---|
| 8,283,275 | B2 | 10/2012 | Heo et al. | |
| 2006/0183633 | A1 | 8/2006 | Iwasaki | |
| 2008/0280169 | A1 * | 11/2008 | Niu | H01M 4/8657 429/409 |
| 2015/0044594 | A1 | 2/2015 | Wu et al. | |
| 2015/0147680 | A1 | 5/2015 | Choi et al. | |
| 2016/0040299 | A1 * | 2/2016 | Allemand | C23C 24/10 427/397.7 |

FOREIGN PATENT DOCUMENTS

| | | | | |
|---|---|---|---|---|
| DE | 698 24 875 | T2 | 7/2005 | |
| DE | 10 2014 118 286 | A1 | 6/2015 | |
| DE | 10 2015 108 604 | A1 | 12/2015 | |
| EP | 1 842 589 | A1 | 10/2007 | |
| JP | 2003-346814 | A | 12/2003 | |
| JP | 2007-149513 | A | 6/2007 | |
| JP | 2009-533830 | A | 9/2009 | |
| JP | 2011-222132 | A | 11/2011 | |
| JP | 2013-127869 | A | 6/2013 | |
| JP | 2015-512782 | A | 4/2015 | |
| JP | 2016-54157 | A | 4/2016 | |
| WO | 2012/106349 | A2 | 8/2012 | |
| WO | WO 2012106349 | * | 9/2012 | B01J 23/46 |
| WO | 2014/069208 | A1 | 5/2014 | |

* cited by examiner

METHOD FOR PRODUCING A SUPPORTED CATALYST MATERIAL FOR A FUEL CELL

The invention relates to a method for producing a supported catalyst material for a catalytic fuel-cell electrode. The invention further relates to a catalyst material that can be produced by this method, an electrode structure for a fuel-cell with such a material, and a fuel-cell having such an electrode structure.

Fuel-cells use the chemical conversion of a fuel with oxygen into water in order to generate electrical energy. For this purpose, fuel-cells contain the so-called membrane electrode assembly (MEA) as a core component, which is an arrangement of an ion-conducting (usually proton-conducting) membrane and of a catalytic electrode (anode and cathode), respectively arranged on both sides of the membrane. The latter generally comprise supported precious metals—in particular, platinum. In addition, gas diffusion layers (GDL) can be arranged on both sides of the membrane electrode assembly, on the sides of the electrodes facing away from the membrane. Generally, the fuel-cell is formed by a plurality of MEA's arranged in the stack, the electrical power outputs of which add up. Bipolar plates (also called flow field plates or separator plates), which ensure a supply of the individual cells with the operating media, i.e., the reactants, and which are usually also used for cooling, are generally arranged between the individual membrane electrode assemblies. In addition, the bipolar plates also ensure an electrically-conductive contact to the membrane electrode assemblies.

During operation of the fuel-cell, the fuel (anode operating medium)—particularly, hydrogen $H_2$ or a gas mixture containing hydrogen—is supplied to the anode via an open flow field of the bipolar plate on the anode side, where electrochemical oxidation of $H_2$ to protons $H^+$ with loss of electrons takes place ($H_2 \rightarrow 2H^+ + 2e^-$). Protons are transported (water-bound or water-free) from the anode chamber into the cathode chamber across the electrolyte or membrane that separates and electrically insulates the reaction chambers, gas-tightly, from each other. The electrons provided at the anode are guided to the cathode via an electrical line. The cathode receives, as a cathode operating medium, oxygen or a gas mixture containing oxygen (such as air) via an open flow field of the bipolar plate on the cathode side, so that a reduction of $O_2$ to $O^{2-}$ with gain of electrons takes place ($\frac{1}{2}O_2 + 2e^- \rightarrow O^{2-}$). At the same time, the oxygen anions react in the cathode chamber with the protons transported across the membrane to form water ($O^{2-} + 2H^+ \rightarrow H_2O$).

Platinum or platinum alloys are used as catalytic materials for catalyzing the aforementioned fuel-cell reactions. Since the reactions involve an electrochemical surface process, the largest possible catalytic surface (ECSA) is sought. For this purpose, particles of the catalytic material in the size range of a few nanometers are applied to a carbon carrier with a large surface area. In the course of fuel-cell operation, however, some of the electrical power is lost due to electrode degradation. The main reason for this is the loss of ECSA and activity due to (unfavorable) operating conditions. The underlying mechanisms include, among other things, severing of the platinum from the carbon carrier (platinum corrosion), whereby the particles lose their electrical contact and no longer contribute to the effective catalysis. Also involved is the agglomeration (coalescence) of the particles, whereby the catalytic surface decreases. Further degradation mechanisms include corrosion of the alloying elements, cobalt or nickel, but also corrosion of platinum itself, growth of the platinum nanoparticles by Ostwald ripening, growth of the platinum nanoparticles by migration, and sintering on the carbon surface.

In order to counteract the loss of catalytic activity, and thus to ensure the performance requirements over the operating time of the fuel-cell, an excess amount of the precious metal is usually used in the manufacture of the electrodes. However, this measure is quite cost-intensive.

The use of stabilized carbon carriers is also known. While this corrosion (disintegration) of the carbon is improved, the adhesion of the catalyst particles is not.

Furthermore, nanostructured thin-film catalysts are known in which the amount of platinum can be reduced by increased service life. However, the nanostructure causes problems in the removal of the reaction water.

In addition, the activity of the catalyst is increased by alloying other elements (especially, cobalt and nickel) in order to ensure a higher fuel throughput and thus a high electrical power. However, the problem of lack of adhesion is not eliminated by the addition of alloying elements. Owing to the non-precious character of these elements compared to platinum, such catalysts are even significantly more susceptible to corrosion.

There is also research work with new catalyst carrier concepts in which adhesion promoter layers on an oxidic basis are to improve the adhesion of the catalyst material. However, the oxides used are usually poor conductors, so that power losses occur due to contact resistances between catalyst and carrier.

DE 698 24 875 T2 describes the production of non-conductive, nanostructured carrier structures from an organic pigment on a carrier film. These carrier structures are coated by means of physical or chemical vapor deposition (PVD, CVD) in order to produce nanostructured catalyst elements, which are then transferred directly to the polymer electrolyte membrane of the fuel-cell by a pressing process. The catalyst elements can thereby have different compositions on their surface and in their internal volume by sequential deposition of different materials.

In addition, the admixture of metal carbides to the catalytic material or the direct application of metal carbides to the carbon carrier is known (for example, EP 1842589 A1). In this case, there is, at most, a physical adhesion of the carbide to the carrier material.

US 2006/0183633 A1 describes a catalyst structure for the anode of a direct methanol fuel-cell (DMFC). This comprises a carrier material of Al, Ti, TiN, W, Mo, or Hf on which local elevations (nanodots) are deposited from a metal carbide, such as WC, MoC or TaC, and on these catalytic particles by means of physical or chemical vapor deposition. Both the bumps and the catalytic particles consist of a metal carbide, such as WC, MoC, or TaC, and may optionally be provided with a carbon nanohorn (CNH) coating.

The catalytic particles are generally present on an electrically-conductive carrier material of large specific surface area, which is often a particulate carbon-based material—for example, carbon nanotubes (CNT) or the like. The deposition of the catalytic particles on the carrier material is usually carried out with wet-chemical methods, e.g., via sol-gel process, using metal-organic precursor compounds of the catalytic metal (for example, U.S. Pat. No. 8,283,275 B2). In addition, the deposition of catalytic precious metal particles onto the carbon carrier from the gas phase is also known (for example, U.S. Pat. No. 7,303,834 B2). Subsequently, the catalyst thus supported is mixed with an ionomer and applied, in the form of a paste or suspension as a coating to a carbon paper, directly onto the polymer electrolyte membrane or to the gas diffusion layer, and dried.

The aim of the invention is to provide a method for producing a supported catalyst material for a catalytic fuel-cell electrode which leads to a material that at least partially solves the problems of the prior art. In particular, a catalyst material is to be produced which has an improved adhesion of the catalytic material to the carrier material and, thus, an increased stability and longer service life.

This aim is achieved by a production method, a supported catalyst material which can be produced by the method, an electrode structure with such a material, and a fuel-cell having such an electrode structure with the features of the independent claims. Additional preferred embodiments of the invention arise from the other features stated in the sub-claims and the following description.

The method according to the invention for producing a supported catalyst material for a fuel-cell electrode comprises the following steps (in particular, in the order indicated):

- providing an electrically-conductive, carbon-based carrier material;
- depositing a carbide-forming substance from the gas phase onto the carbon-based carrier material to produce a carbide-containing layer by chemical reaction of the carbide-forming substance with the carbon of the carrier material, and
- depositing a catalytically-active precious metal or an alloy of said precious metal from the gas phase to form a catalytic layer.

The invention is thus characterized in that a chemical bond between the carbide-forming substance and the carrier material is produced by creation of a carbide or a carbide-like bond between the substance and the carbon. This provides an improvement in the bonding of the catalyst material to the surface. In known methods in which the catalytic material is separated out from the gas phase by a wet-chemical or purely physical deposition process, there is only one physical connection by adsorption, which is naturally weaker than a chemical (covalent) bond. Because of the stable joining, the diffusion of the catalytic structures on the carbon carrier surface, and therefore its coalescence (sintering), is prevented. Carbides are also distinguished by a high mechanical and chemical stability, and also by a high electrical conductivity. Thus, power losses due to contact resistances between catalyst and carrier can be minimized.

It goes without saying that the carbide-containing layer does not necessarily have to form its own carbide phase, e.g., in the form of nanocrystallites grown on the surface that have a crystallographic carbide structure. Rather, it is sufficient for carbide bonds or carbide-like bonds to form at the immediate interface between carbon and the carbide-containing layer, which means that there is a covalent bond between the carbide-forming element and the carbon, so that chemical bonding conditions are present which locally correspond to those in a carbide crystal, but do not have the periodicity and long-range order corresponding to a crystal. In addition, a phase of the pure, unreacted carbide-forming substance, which is also part of the carbide-containing layer, can be applied to this boundary layer.

Furthermore, at the boundary layer between the carbide-containing layer and the catalytic precious metal layer, a stable alloy is formed between the carbide-forming substance (hereinafter also referred to as carbide former) and the precious metal or its alloy. A stable attachment of the catalyst to the carbon carrier over all interfaces is thus achieved.

The deposition of the carbide-forming substance and deposition of the catalytically-active precious metal or its alloy is from the gas phase, and thus not by a wet-chemical process from a solvent. By the deposition from the gas phase, it is possible to achieve a targeted structuring at an atomic level that cannot be provided via classical, wet-chemical synthesis routes. Moreover, the vapor deposition allows a significant reduction in the amounts used—in particular, of the catalytic precious metal or its alloy. In this way, only precious metal is used on the surface on which the catalytic reaction takes place, while a less costly material is present in the interior.

The depositions may be done with any gas phase deposition process. Suitable methods include physical vapor deposition (PVD), chemical vapor deposition (CVD), atomic layer deposition (ALD), and others.

The main task of the carbide-containing layer is to ensure stable adhesion of the precious metal or its alloy to the carrier material and, at the same time, to form the catalytic structure in its interior by a comparatively inexpensive material. In order to obtain a good bond to the carbon carrier, a suitable crystal lattice of the carbide or the substance forming the carbide is advantageous, i.e., a similar crystal structure and a lattice constant similar to that of the carbon material. To further provide stable attachment of the catalytic surface layer of precious metal, it is also desirable to have a high surface energy and a lattice structure that is compatible with the catalytic precious metal or its alloy, wherein it is preferred here that the lattice constant of the carbide or the carbide-forming substance correspond at most to that of the catalytic surface layer—in particular, that of platinum. By selecting a lattice of the carbide with a slightly lesser lattice constant, a contraction of the precious metal lattice and, by the resulting distorting effects of the crystal lattice, as well as by quantum mechanical interactions between the lattices, an increased activity, as well as a particularly dense ball packing of the precious metal, are achieved. Overall, the adhesion is determined by the surface energy, a good concordance between the crystal lattices with respect to symmetry and lattice parameters, as well as the bonding states at the boundary surface (displacement of the d-band center). In order to allow the uptake or release of electrons during the catalytic fuel-cell reactions taking place at the catalytically-active precious metal, the volume material of the core layer should also have a good electrical conductivity.

Suitable carbide-forming substances meeting these criteria include titanium (Ti), zirconium (Zr), hafnium (Hf), tungsten (W), molybdenum (Mo), boron (B), vanadium (V), aluminum (Al), scandium (Sc), yttrium (Y), silicon (Si), chromium (Cr), and nickel (Ni), or a mixture of two or more of these elements. Of these, titanium, which reacts with carbon to form titanium carbide TiC, is particularly preferred.

For the vapor deposition of the carbide-forming substance, either the pure element itself or a chemical precursor compound therefrom is used, transferred into the gas phase, and deposited on the surface of the carbon-based carrier material. This leads to the corresponding carbide or the carbide-like bond being formed spontaneously by chemical reaction with carbon.

The layer thickness of the carbide-containing layer is preferably selected to be as thin as possible in the region of fewer atomic layers relative to the carbide-forming substances. In an advantageous embodiment, the layer thickness is in the range of 1 atomic layer to 50 atomic layers on average—in particular, an average of 1 atomic layer to 20 atomic layers and, preferably, an average of 1 to 10 atomic layers. These layer thicknesses are sufficient to bring about the desired carbide formation.

Likewise, the layer thickness of the surface layer of the catalytically-active precious metal or its alloy is preferably selected to be as thin as possible, in order to make the expensive material on the surface as completely accessible as possible. In particular, the surface layer has an average layer thickness of 1 to 6 atomic layers—preferably, of 1 to 4 atomic layers and, particularly preferably, of 1 to 2 atomic layers.

The setting of the layer thicknesses of the individual layers in the region of fewer atomic layers allows the targeted use of interface effects for fuel-cell catalysis. The layer thicknesses can be set in a simple manner by suitable selection of the duration of the vapor deposition processes.

Particularly suitable as precious metal for the catalytic surface layer are metals of the platinum group comprising ruthenium (Ru), rhodium (Rh), palladium (Pd), osmium (Os), iridium (Ir), and platinum (Pt), or an alloy of these metals. In particular, the surface layer comprises platinum or a platinum alloy—preferably, essentially pure platinum.

In a preferred embodiment of the invention, the deposition of the carbide-forming substance and the deposition of the catalytically-active precious metal or its alloy take place in a time-overlapping manner, wherein a gradual enrichment of the catalytically-active precious metal or its alloy, or a gradual depletion of the substance forming the carbide in the deposited layer, is produced from inside to outside. This can be done by the relative proportions of the carbide former and the precious metal or its alloy in the gas phase being changed continuously or stepwise during the deposition process. For example, the proportion of the carbide former may be varied from 100% to 0% and that of the precious metal or its alloy from 0% to 100% during the deposition process. Such an adjustment of a gradient is easy to provide with the aforementioned vapor deposition processes. The product is a continuous layer structure, in which the content of the carbide former decreases from inside to outside, and the content of the precious metal or its alloy increases correspondingly. Advantageously, the outermost layer, or at least the outermost atomic layer, consists up to 100% of the catalytic precious metal or its alloy.

According to a further embodiment of the method, a diffusion barrier layer is deposited on the carbide-containing layer after the deposition of the carbide-forming substance, and before the catalytically-active precious metal or its alloy is deposited. The diffusion barrier layer prevents the diffusion of the electrochemically non-precious material of the carbide former forming the core onto the surface, where the atoms of the carbide former are dissolved out through the corrosive environment in the fuel-cell, and the catalyst is thus destabilized. The diffusion barrier layer is preferably covered as completely as possible by the catalytic precious metal or its alloy in the one further vapor deposition step. Suitable materials for the diffusion barrier include, for example, gold (Au), palladium (Pd), ruthenium (Ru), tungsten (W), osmium (Os), rhodium (Rh), and iridium (Ir), or a mixture or alloy thereof. Gold is particularly preferred.

In a further advantageous embodiment, defect sites and/or functionalizations are produced on the surface of the carbon-based carrier material before the deposition of the carbide-forming substance. Defect sites, in the present case, are understood as defects in the crystal lattice structure of the carbon, i.e., deviations from the remaining lattice structure. The defect sites thus comprise imperfections, i.e., unoccupied lattice sites, but also the presence of foreign atoms (not C) on the carbon lattice sites, which, due to their atomic radius deviating from C, lead to lattice distortion, or of foreign atoms on interstitials, in the sense of an intercalation, which can likewise lead to lattice distortion. Suitable foreign atoms include, for example, nitrogen (N), boron (B), oxygen (O), silicon (Si), and others. The term, functionalizations, means chemical groups that are present covalently bonded to the carbon of the carrier. Such functionalizations include, for example, hydrogen groups (—H), hydroxyl groups (—OH), carboxyl groups (—COOH), and others. In this way, the bonds—in particular, double bonds of the carbon surface—are locally broken, and a functionalization is produced that is available for the reaction with the carbide formers. Both defect sites and functionalizations on the surface of the carbon-based carrier material serve as condensation nuclei for the deposition of the carbide-forming substance, and at the same time promote chemical carbide formation due to their increased reactivity. The local formation thus produced of a carbide-like connection between carbon and carbide formers functions as a core for the further growth of the layer or the catalytic structure on the carbon carrier. The deposition of additional atoms of carbide is preferably carried out at this site and results in the growth of a particle. However, in principle, carbon carriers that have not been pre-treated can also be used. Also, in this case, there are local carbide formations and an increase in the structures around these cores.

Imperfections can be produced by irradiating the carrier material with high-energy electromagnetic radiation or with particle radiation, or by treatment with a gas plasma. Alternatively, a carrier material can be used which already has defect sites. Foreign atoms or functionalizations can also be introduced or generated by treatment with a gas plasma—especially, hydrogen ($H_2$), oxygen ($O_2$), nitrogen ($N_2$), or others—or by treatment with a chemical agent or an acid. The carbon-based carrier material is predominantly designed to provide a large, specific surface area for the applied catalyst and also to establish the electrical connection between the catalytic centers of the material and the external circuit of the fuel-cell. Preferably, the carbon-based carrier material has a porous, particulate, i.e., loose, fill structure. This includes, in particular, spheroidal forms or fibers. Suitable materials include, in particular, carbon nanostructures, e.g., carbon nanotubes, carbon nanorods, carbon nanofibers, carbon nanobands, carbon hollow spheres; as well as graphite, volcano, graphitized carbon, graphene, ketjen black, acetylene black, furnace black, carbon black, activated carbon, and meso phase carbon.

The structure of carbide-containing layer and catalytic layer, and, in some cases, further layers in the form of discrete catalytic structures is preferably present on the carbon-based carrier material. Within the scope of the present invention, the term, "catalytic structures," is understood to mean structures which are formed (grown, deposited) on the carbon-based carrier material and are arranged discretely, i.e., separately, on the carrier material. Thus, there may be gaps between adjacent catalytic structures in which the carrier material is exposed. The catalytic structures can have an arbitrary shape, e.g., approximately the shape of a ball segment—in particular, a hemisphere. However, it is understood that the structures generally do not have the ideal shape of a spherical surface and are determined, in particular, by the crystal structure of the materials used. Irrespective of their geometric form, the catalytic structures have a type of core-shell structure, more precisely a "cut-open" core-shell structure, in which the "cutting surface" is arranged on the carrier material and in contact therewith.

Another aspect of the present invention relates to a supported catalyst material for a fuel-cell electrode which is producible, in particular, using the method according to the invention, and an electrically-conductive, carbon-based carrier material, a carbide-containing layer deposited on the carrier material, and a catalytic layer of a catalytically-active precious metal or an alloy of such deposited on the surface of the carbide-containing layer.

The material is distinguished by an excellent adhesion of the catalytic layer, and thus a low tendency to corrosion and sintering. Furthermore, a comparatively small amount of the precious metal or its alloy is required, because the interior of the catalytic structures is essentially filled by the less expensive carbide former.

A further aspect of the present invention relates to an electrode structure for a fuel-cell comprising a flat carrier and a catalytic coating, arranged on at least one of the two flat sides of the carrier which comprises the supported catalyst material according to the present invention. Thereby, the flat support is, for example, a polymer electrolyte membrane for a fuel-cell. In this case, it is also referred to as a catalytically-coated membrane (CCM). Alternatively, the flat carrier can be a gas-permeable, electrically-conductive substrate, e.g., a gas diffusion layer (GDL), or a further carrier layer of the fuel-cell—for example, carbon paper or the like. In the case of a catalytically-coated gas diffusion layer, it is also referred to as a gas diffusion electrode.

The electrode structure can be produced by laminating the catalyst material directly onto the flat support. For this purpose, a suspension or paste is prepared comprising the catalyst material, a solvent, and, if desired, further additives, such as binders or the like, and applied by any method to the flat support and dried.

A further aspect of the present invention relates to a fuel-cell with a polymer electrolyte membrane and in each case a layer arranged on flat sides thereof, at least one of which comprises the supported catalyst material of the invention.

The various embodiments of the invention mentioned in this application may be combined advantageously with one another unless stated otherwise in individual cases.

Figure 2:
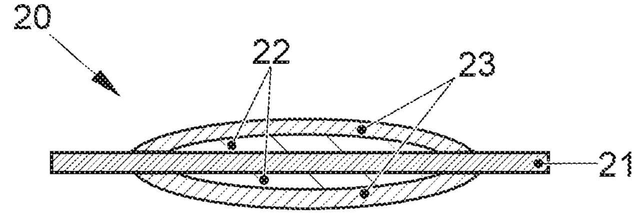
Figure 3:
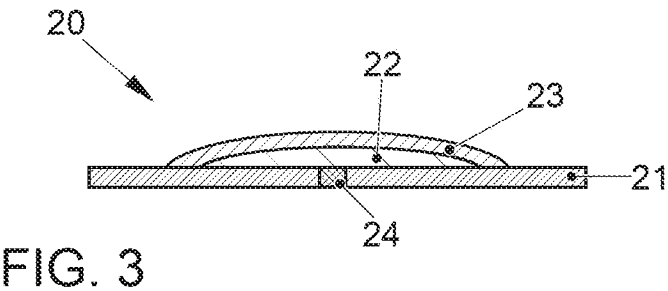
Figure 4:
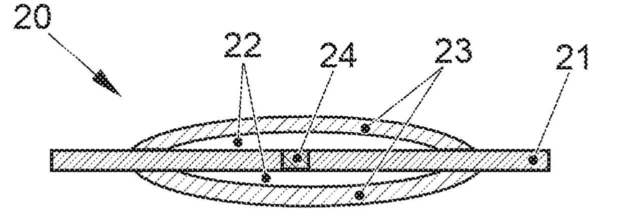
Figure 5:
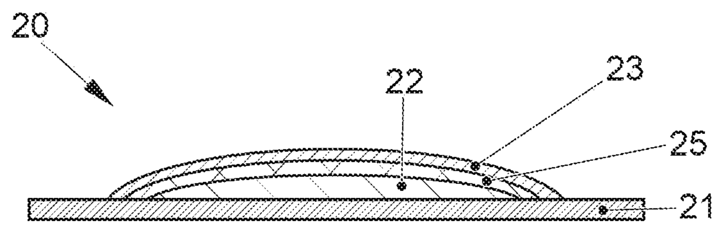
Figure 6:
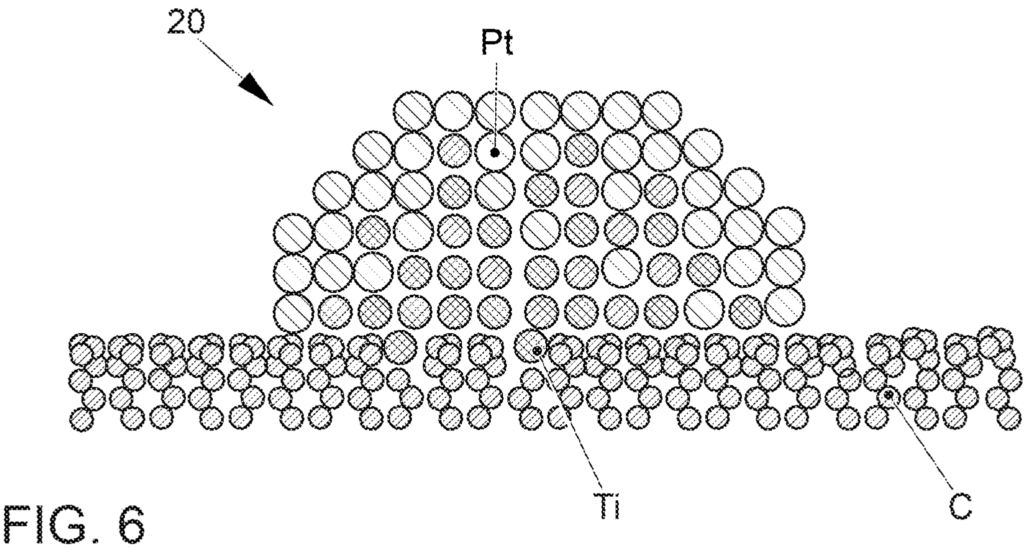
Figure 7:
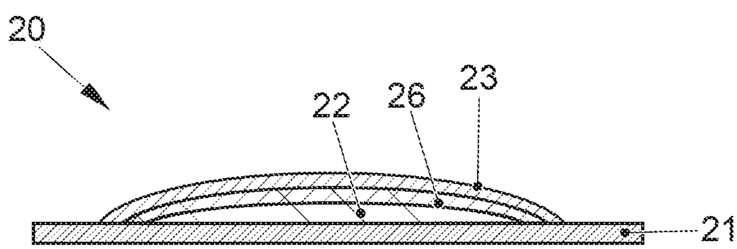
Figure 8:
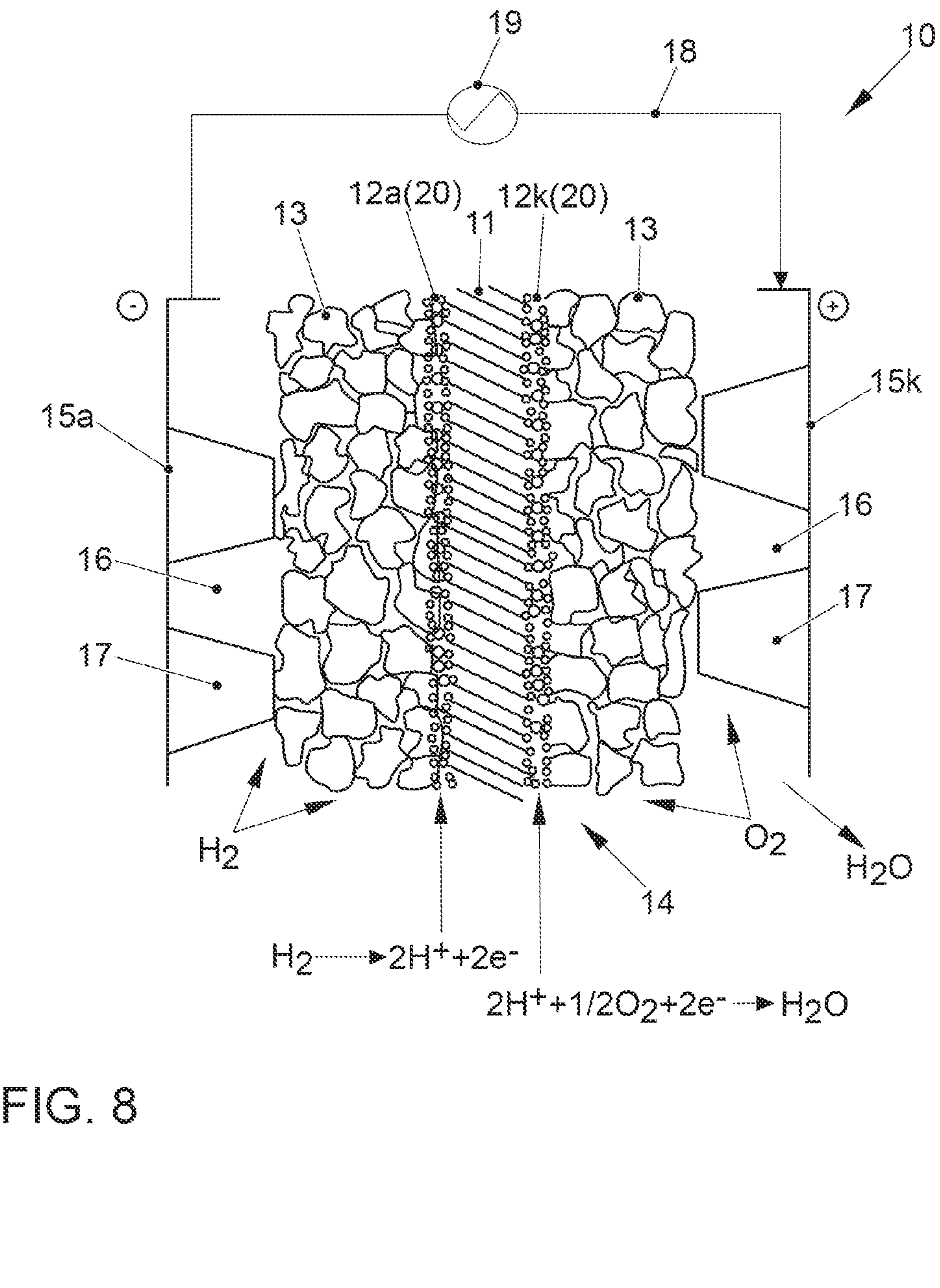

The invention is explained below in exemplary embodiments, with reference to the respective drawings. The following are shown:

FIG. 1 a schematic representation of a supported catalyst material according to a first embodiment of the invention, FIG. 2 a schematic representation of a supported catalyst material according to a second embodiment of the invention, FIG. 3 a schematic representation of a supported catalyst material according to a third embodiment of the invention, FIG. 4 a schematic representation of a supported catalyst material according to a fourth embodiment of the invention, FIG. 5 a schematic representation of a supported catalyst material according to a fifth embodiment of the invention, FIG. 6 a schematic representation of a supported catalyst material at the molecular level according to the fifth embodiment of the invention, FIG. 7 a schematic representation of a supported catalyst material according to a sixth embodiment of the invention, and FIG. 8 a sectional view of a fuel-cell with a catalyst material according to the invention.

FIGS. 1 through 7 show highly schematic and idealized supported catalyst materials according to the present invention. In each case, a very greatly enlarged section of the material is depicted as a section through an exemplary structure. The same reference numerals are used here for identical elements and are not explained in detail for each embodiment.

The described supported catalyst material according to FIG. 1, designated overall as 20, has an electrically-conductive, carbon-based carrier material 21 selected from the aforementioned materials—in this case, for example, carbon black. A deposited, carbide-containing layer 22, which is selected from one of the aforementioned materials—in this case, for example, titanium Ti—is arranged on the carrier material 21. At least at the interface between the carrier material 21 and the carbide-containing layer 22, carbides—in this case, titanium carbide TiC—or carbide-containing bonds are formed, i.e., this leads to a chemical—in particular, covalent—bond between these two layers 21, 22. A deposited catalytic layer 23 of a catalytically-active precious metal or an alloy of such that is selected from one of the aforementioned materials—here, for example, platinum Pt—is arranged on the surface of the carbide-containing layer 22. An alloy of the carbide former Ti and the precious metal Pt is formed at the interface between the carbide-containing layer 22 and the catalytic layer 23, so that, here also, a material-to-material bond is present. The structure of carbide-containing layer 22 and catalytic layer 23 is in the form a plurality of discrete catalytic structures or particles, of which only one is shown here.

The catalyst material according to FIG. 2 differs from the one in FIG. 1 in that the catalytic structures are grown on both sides on the carrier material 21. Deviating from the symmetrical arrangement shown, the structures may also be arranged non-symmetrically on the two sides of the carrier material 21.

The catalyst materials 20 according to FIGS. 1 and 2 may be formed by first depositing the carbide former Ti via a gas phase deposition process on the carbon-based carrier material 21 to form the carbide-containing layer 22 having the desired layer thickness. This results in an initial local deposition and carbide formation of individual titanium atoms and an increase in the layer 22 caused by accumulation of further titanium atoms on these "cores." After reaching the desired layer thickness of, for example, 1 to 10 atomic layers of Ti, the deposition of the precious metal Pt on the carbide-containing layer 22 is then accomplished, forming the catalytic layer 23. Once the desired layer thickness of, for example, 1 to 5 atomic layers Pt has been reached, the catalyst material 20 is obtained. Whether the catalytic structures grow on the carrier material 21 on one or both sides depends primarily on the accessibility of the various sides of the carrier material.

The catalyst material 20 shown in FIG. 3 differs from that in FIG. 1 in that the carbon-based carrier material 21 has defect sites 24. In the present example, this is a lattice defect in the crystal lattice of the carbon.

The catalyst material 20 shown in FIG. 4 essentially corresponds to that in FIG. 3, except that, similarly to FIG. 2, the catalytic structures are grown on both sides of the carbon carrier 21.

The catalyst materials 20 according to FIGS. 3 and 4 may be produced with a method analogous to the one for the exemplary embodiments according to FIGS. 1 and 2, except that, prior to the deposition process of the carbide former, the carbon carrier material 21 is subjected to a treatment process—for example, a plasma treatment for generating the defect sites 24. The defect sites 24 produced in this way promote the initial deposition and nucleation of the carbide former.

FIGS. 5 and 6 show another embodiment of a catalyst material 20 according to the invention. In a modification to the materials according to FIGS. 1 through 4, a mixed layer 25 is present here between the carbide-containing layer 22 and the catalytic layer 23, which mixed layer is made up of a mixture or alloy of the carbide former and of the catalytic precious metal—in this case, a Pt—Ti alloy. In particular, the mixed layer 25 is designed in such a way that the proportion of Ti decreases from inside to outside, and the proportion of Pt increases in the opposite direction. Thus, the entire layer structure 22, 25, 23 may also be described as a single, continuous layer, within which the titanium content falls from 100% (inside) to 0% (outer surface), and the platinum content increases from 0% (inside) to 100% on the surface. According to a further embodiment, the mixed layer 25 has a homogeneous Pt—Ti alloy, i.e., without a concentration gradient. Moreover, the layer structure according to FIGS. 5 and 6 can be grown on both sides of the carbon carrier 21 (analogously to FIGS. 2 and 3) and/or be combined with the generation of a defect site 24 in the carbon carrier 21 (analogously to FIGS. 3 and 4).

The material 20 according to FIGS. 5 and 6 can be produced by continuously varying the composition of the gas phase during a continuous vapor deposition process.

Another version of the catalyst material 20 according to the invention is shown in FIG. 7. In a modification to the materials according to FIGS. 1 through 4, a diffusion barrier layer 26 made of one of the aforementioned materials—in this case, for example, gold Au—is present here between the carbide-containing layer 22 and the catalytic layer 23. The diffusion barrier layer 26 prevents diffusion of the non-precious carbide former onto the surface of the catalytic structure and, thus, its dissolution. The material 20 according to FIG. 7 can be produced in that, following the deposition of the carbide former in an additional vapor deposition step, the material of the diffusion barrier layer 26 is deposited onto the layer 22, and, then, the catalytic precious metal is deposited onto the diffusion barrier layer 26.

In order to manufacture an electrode for a fuel-cell, first, a composition (slurry, paste, or the like) is produced from the catalytic material 20 according to the invention and contains a solvent in addition to the catalytic material 20, and may contain further additives—in particular, a polymeric binder. This composition is then applied to a flat support as a coating, for which any coating process, e.g., coating, spraying, scraping, printing, or the like, can be used. The flat carrier is, in particular, a polymer electrolyte membrane of the fuel-cell, which is preferably coated on both sides with the catalytic material. Alternatively, the catalytic coating can also be applied to a gas diffusion layer or to another gas-permeable, electrically-conductive substrate, such as carbon paper.

FIG. 8 shows the structure of such a fuel-cell 10 in a schematic sectional view. The core piece of the fuel-cell 10 is a membrane electrode arrangement (MEA), designated overall by reference numeral 14. The MEA 14 comprises a polymer electrolyte membrane 11, two catalytic electrodes or catalytic coatings arranged on its flat sides, viz., an anode 12*a* and a cathode 12*k*, as well as two gas diffusion layers 13 arranged on both of its sides. The polymer electrolyte membrane 11 is an ion-conducting—in particular, proton-conducting—polymer, e.g., a product marketed under the trade name, Nafion®. The catalytic electrodes 12*a*, 12*k* comprise the catalytic material according to the invention and, in the illustrated example, are designed as a double-sided coating of the membrane 11. The gas diffusion layers 13 consist of a gas-permeable, electrically-conductive material which, for example, has the structure of a foam or a fiber structure or the like, and serves to distribute the reaction gases to the electrodes 12*a* and 12*k*. Bipolar plates 15, viz., an anode plate 15*a* and a cathode plate 15*k*, are connected to the membrane electrode arrangement 14 on both sides. Usually, a plurality of such individual cells 10 are stacked into a fuel-cell stack so that each bipolar plate is composed of an anode plate 15*a* and a cathode plate 15*k*. The bipolar plates 15*a*, 15*k* each comprise a structure of reactant channels 16, which are open in the direction of the gas diffusion layers 13 and serve to supply and distribute the reactants of the fuel-cell. Thus, via the reactant channels 16 of the anode plate 15*a*, the fuel—here, hydrogen $H_2$—is supplied, and, via the corresponding channels 16 of the cathode plate 15*k*, oxygen $O_2$ or an oxygen-containing gas mixture—in particular, air. The bipolar plates 15*a*, 15*k* are, via an external circuit 18, connected to one another and to an electrical load 19—for example, a traction motor for an electric vehicle or a battery.

During operation of the fuel-cell 10, the hydrogen is supplied via the reactant channels 16 of the anode plate 15*a*, distributed via the gas diffusion layer 13 on the anode side, and fed to the catalytic anode 12*a*. Here, a catalytic dissociation and oxidation of hydrogen $H_2$ to protons $H^+$ takes place, with release of electrons, which are removed via the circuit 18. On the other hand, via the cathode plate 15*k*, the oxygen is conducted to the catalytic cathode 12*k* via the cathode-side gas diffusion layer 13. At the same time, the proteins $H^+$ formed on the anode side diffuse across the polymer electrolyte membrane 11 in the direction of the cathode 12*k*. In this case, the supplied atmospheric oxygen reacts to the catalytic precious metal, taking up the electrons supplied via the external circuit 18 with the protons to form water, which is discharged from the fuel-cell 10 with the reaction gas. The electrical load 19 can be supplied by the electrical current flow thus generated.

The catalyst material 20 according to the present invention may be used for the anode 12*a* and/or the cathode 12*k* of fuel-cells. The fuel-cell 10 equipped with the catalytic material 20 according to the invention is characterized in that the catalytic electrodes 12*a*, 12*k* have a low corrosion tendency, and thus high long-term stability. At the same time, comparatively little catalytic precious metal is required, since the main volume of the catalytic material of the electrodes is formed by a comparatively inexpensive material.

LIST OF REFERENCE SYMBOLS

10 Fuel-cell
11 Polymer electrolyte membrane
12 Catalytic electrode
12*a* Anode
12*k* Cathode
13 Gas diffusion layer
14 Membrane electrode arrangement
15 Bipolar plate
15*a* Anode plate
15*k* Cathode plate
16 Reactant channel
17 Coolant channel
18 Circuit
19 Electrical user/electrical load
20 Supported catalyst material
21 Carbon-based carrier material
22 Carbide-containing layer

23 Catalytic layer
24 Defect site
25 Mix layer
26 Diffusion barrier layer

The invention claimed is:

1. A method for manufacturing a supported catalyst material for a fuel-cell electrode, comprising:

forming a carbide-containing layer by depositing a carbide-forming substance from a gas phase onto an electrically conductive carbon-based carrier material, the carbide-forming substance reacting with carbon of the carrier material; and forming a catalytic layer by depositing a catalytically-active precious metal or an alloy of such a precious metal from the gas phase;

wherein the depositing of the carbide-forming substance and the depositing of the catalytically-active precious metal or the alloy of the precious metal is in a time-overlapping manner, producing a gradual enrichment of the catalytically-active precious metal or its alloy.

2. The method according to claim 1, wherein the carbide-forming substance is selected from the group comprising titanium, zirconium, hafnium, tungsten, molybdenum, boron, vanadium, aluminum, scandium, yttrium, silicon, chromium, and nickel, or a mixture of these.

3. The method according to claim 1, wherein the carbide-containing layer has an average thickness in the range of 1 to 50 atomic layers.

4. The method according to claim 1, wherein the catalytically-active precious metal or its alloy comprises platinum, ruthenium, rhodium, palladium, osmium, iridium, or an alloy of these metals.

5. The method according to claim 1, further comprising forming defect sites on a surface of the carbon-based carrier material before depositing the carbide-forming substance.

6. The method according to claim 1, wherein, after depositing the carbide-forming substance and before depositing the catalytically-active precious metal or its alloy, a diffusion barrier layer is deposited, selected from the group comprising gold, palladium, ruthenium, tungsten, osmium, rhodium, and iridium, or a mixture or alloy thereof.

7. A supported catalyst material for a fuel-cell electrode comprising:

an electrically-conductive, carbon-based carrier material;

a carbide-containing layer on the carrier material; and a catalytic layer of a catalytically-active precious metal or an alloy of such on the surface of the carbide-containing layer, wherein the carbide-containing layer and the catalytic layer are produced by a method comprising depositing a carbide-forming substance and depositing the catalytically-active precious metal or the alloy thereof in a time-overlapping manner, thereby producing a gradual enrichment of the catalytically-active precious metal or its alloy at the surface of the carbide-containing layer.

8. An electrode structure for a fuel-cell, comprising:

a flat carrier, selected from a polymer electrolyte membrane and a gas-permeable, electrically-conductive substrate; and a catalytic coating comprising: an electrically-conductive, carbon-based carrier material; a carbide-containing layer on the carrier material; and a catalytic layer of a catalytically-active precious metal or an alloy of such on the surface of the carbide-containing layer, wherein said catalytic coating is arranged on at least one flat side of the carrier, wherein the carbide-containing layer and the catalytic layer are produced by a method comprising depositing a carbide-forming substance and depositing the catalytically-active precious metal or the alloy thereof in a time-overlapping manner, thereby producing a gradual enrichment of the catalytically-active precious metal or its alloy at the surface of the carbide-containing layer.

9. The method according to claim 1, further comprising forming covalent bonds between carbon atoms of a surface of the carbon-based carrier material and chemical groups that promote carbide formation before depositing the carbide-forming sub stance.

10. The supported catalyst material according to claim 7, wherein the carbide-containing layer has an average thickness in the range of 1 to 50 atomic layers.

11. The supported catalyst material according to claim 7, wherein the carbide-containing layer has an average thickness in the range of 1 to 20 atomic layers.

12. The supported catalyst material according to claim 7, wherein a surface of the carbon-based carrier material comprises defect sites.

13. The supported catalyst material according to claim 7, wherein a surface of the carbon-based carrier material comprises carbon atoms covalently bonded to chemical groups that promote carbide formation.

14. The supported catalyst material according to claim 7, wherein the catalytically-active precious metal or its alloy comprises platinum, ruthenium, rhodium, palladium, osmium, iridium, or an alloy of these metals.

15. The electrode structure according to claim 8, wherein the carbide-containing layer has an average thickness in the range of 1 to 50 atomic layers.

16. The electrode structure according to claim 8, wherein the surface of the carbide-containing layer comprises defect sites.

17. The electrode structure according to claim 8, wherein the surface of the carbon-based carrier material comprises carbon atoms covalently bonded to chemical groups that promote carbide formation.

18. The electrode structure according to claim 8, wherein the catalytically-active precious metal or its alloy comprises platinum, ruthenium, rhodium, palladium, osmium, iridium, or an alloy of these metals.

19. The method according to claim 1, wherein producing a gradual enrichment of the catalytically-active precious metal or its alloy comprises changing the relative proportions of the carbide-forming substance and the precious metal or alloy of such a precious metal in the gas phase continuously during depositing of the carbide-forming substance and the depositing of the catalytically-active precious metal or the alloy of the precious metal.

* * * * *